(12) United States Patent
Todderud et al.

(10) Patent No.: US 12,740,512 B2
(45) Date of Patent: Sep. 22, 2026

(54) HEADER FOR AN AGRICULTURAL HARVESTER HAVING INTEGRAL SEED SAVER

(71) Applicant: CNH Industrial America LLC, New Holland, PA (US)

(72) Inventors: Stephen Todderud, Lancaster, PA (US); Jeff Thomas, Gordonville, PA (US); Brian P. Crow, Andalusia, IL (US)

(73) Assignee: CNH Industrial America LLC, New Holland, PA (US)

( * ) Notice: Subject to any disclaimer, the term of this patent is extended or adjusted under 35 U.S.C. 154(b) by 543 days.

(21) Appl. No.: 18/028,622

(22) PCT Filed: Sep. 28, 2021

(86) PCT No.: PCT/US2021/052413
§ 371 (c)(1),
(2) Date: Mar. 27, 2023

(87) PCT Pub. No.: WO2022/067252
PCT Pub. Date: Mar. 31, 2022

(65) Prior Publication Data

US 2023/0363314 A1 Nov. 16, 2023

Related U.S. Application Data

(60) Provisional application No. 63/084,197, filed on Sep. 28, 2020.

(51) Int. Cl.
*A01F 12/10* (2006.01)

(52) U.S. Cl.
CPC .................................... *A01F 12/10* (2013.01)

(58) Field of Classification Search
CPC ......... A01F 12/10; A01D 41/06; A01D 41/14; A01D 41/16; A01D 57/06; A01D 57/20; A01D 61/008

(Continued)

(56) References Cited

U.S. PATENT DOCUMENTS 1,770,709 A * 7/1930 Patterson ............... A01D 34/18 56/307
2,139,927 A * 12/1938 Bane .................... A01D 34/135 56/297

(Continued)

FOREIGN PATENT DOCUMENTS

AR 067814 A1 10/2009
AR 078792 A1 12/2011

(Continued)

OTHER PUBLICATIONS

International Search Report and Written Opinion for PCT Application No. PCT/US2021/052413 dated Jan. 7, 2022 (12 pages).

(Continued)

*Primary Examiner* — Christopher J Sebesta
*Assistant Examiner* — Sunny D Webb
(74) *Attorney, Agent, or Firm* — Selene Haedi

(57) ABSTRACT

A header for an agricultural harvester including an infeed conveyor having a fore end and an aft end, a center knife drive disposed adjacent to and forwardly of the infeed conveyor, and a knife drive cover covering the center knife drive. The knife drive cover includes a main body substantially covering an entire width of the center knife drive, and a seed saver extending rearwardly from an aft end of the main body. The seed saver is substantially planar, includes a width substantially the same as a width of the infeed conveyor, and defines a plane substantially parallel to a longitudinal axis of the infeed conveyor. The seed saver is integrated with the knife drive cover. As such, the seed saver is secured to the header without need for metal brackets and other associated mounting hardware.

15 Claims, 8 Drawing Sheets

(58) Field of Classification Search

USPC ......... 56/181, 296, 307, 158, 153, 185, 257; 198/841

See application file for complete search history.

(56) References Cited

U.S. PATENT DOCUMENTS

| | | | | |
|---|---|---|---|---|
| 2,347,365 | A * | 4/1944 | Paradise | A01D 57/20 198/841 |
| 4,665,685 | A * | 5/1987 | Rupprecht | A01D 41/14 56/15.8 |
| 4,722,172 | A * | 2/1988 | Pearce | A01D 57/26 56/14.4 |
| 4,891,932 | A * | 1/1990 | Johnson | A01D 41/14 56/158 |
| 7,412,816 | B2 * | 8/2008 | Coers | A01D 57/20 56/208 |
| 7,478,522 | B1 | 1/2009 | Lovett et al. | |
| 7,543,428 | B1 * | 6/2009 | Puryk | A01D 57/20 430/127 |
| 7,908,836 | B1 * | 3/2011 | Rayfield | A01D 57/20 56/181 |
| 7,958,711 | B1 * | 6/2011 | Sauerwein | A01D 57/20 56/181 |
| 8,024,915 | B2 | 9/2011 | Sauerwein et al. | |
| 8,479,483 | B1 * | 7/2013 | Huseman | A01D 41/14 56/181 |
| 8,484,939 | B1 * | 7/2013 | Cormier | A01D 41/14 56/181 |
| 8,813,465 | B2 | 8/2014 | Houston | |
| 9,622,409 | B2 | 4/2017 | Coers et al. | |
| 9,635,810 | B2 * | 5/2017 | Leys | A01D 34/14 |
| 9,699,959 | B2 | 7/2017 | Wilbert | |
| 9,814,183 | B2 * | 11/2017 | Allochis | A01D 57/26 |
| 9,961,828 | B2 * | 5/2018 | Cook | A01D 34/04 |
| 10,172,280 | B2 * | 1/2019 | Cook | A01D 34/30 |
| 10,470,370 | B2 | 11/2019 | Fuchtling | |
| 10,813,290 | B2 * | 10/2020 | Modak | A01D 61/002 |
| 11,109,529 | B2 | 9/2021 | Fuechtling et al. | |
| 11,483,971 | B2 * | 11/2022 | Ricketts | A01D 41/14 |
| 11,684,012 | B2 * | 6/2023 | Talbot | A01D 57/20 56/181 |
| 2009/0249760 | A1 * | 10/2009 | Sauerwein | A01D 41/14 56/181 |
| 2014/0090346 | A1 * | 4/2014 | Wilbert | A01D 34/003 56/257 |
| 2016/0135366 | A1 | 5/2016 | Cook et al. | |

FOREIGN PATENT DOCUMENTS

| | | | |
|---|---|---|---|
| AR | 108515 | A1 | 8/2018 |
| AR | 114710 | A1 | 10/2020 |
| EP | 3434095 | A1 | 1/2019 |

OTHER PUBLICATIONS

Technical Substantive Examination Report for Argentina Patent App. No. 20210102617, dated Aug. 8, 2024, 13 pages.

Grant Report for Argentina Patent App. No. 20210102617, dated May 14, 2025, 6 pages.

* cited by examiner 108
234
232
222
$W_{IC}$
$W_{SS}$
240
240
240
226
224
230

232
230
236
234
108
240
244
222

HEADER FOR AN AGRICULTURAL HARVESTER HAVING INTEGRAL SEED SAVER

The exemplary embodiments of present invention relate generally to a header of a plant cutting machine (e.g., a combine harvester) and, more specifically, to a header having an integrated seed saver which cooperates with a feeder belt to minimize seed loss from the header.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via conveyors such as a lateral draper belts and a central feeder draper belt towards a feederhouse located centrally inside the header.

In conventional headers, projecting lugs of the moving feeder draper belt conveyor expel some of the seeds conveyed by the lateral draper belt conveyors from the header due to the absence of any structure to block the expulsion. This results in the seeds being lost and prevented from being harvested by the header.

SUMMARY OF THE INVENTION

In accordance with an exemplary embodiment there is provided a header for an agricultural harvester comprising an infeed conveyor having a fore end and an aft end, a center knife drive disposed adjacent to and forwardly of the infeed conveyor, and a knife drive cover covering the center knife drive. The knife drive cover comprises a main body substantially covering an entire width of the center knife drive, and a seed saver extending rearwardly from an aft end of the main body. The seed saver is substantially planar, includes a width substantially coextensive with a width of the infeed conveyor, and defines a plane substantially parallel to a longitudinal axis of the infeed conveyor.

In accordance with the exemplary embodiment, there is provided a header for an agricultural harvester including a knife drive cover comprising a main body substantially covering an entire width of a center knife drive, and a seed saver extending rearwardly from an aft end of the main body. The disclosure overcomes the disadvantages of conventional headers by providing a seed saver that is integrated with the knife drive cover.

Other features and advantages of the subject disclosure will be apparent from the following more detail description of the exemplary embodiment.

BRIEF DESCRIPTION OF THE DRAWINGS

The foregoing summary, as well as the following detailed description of the exemplary embodiment of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Figure 1:
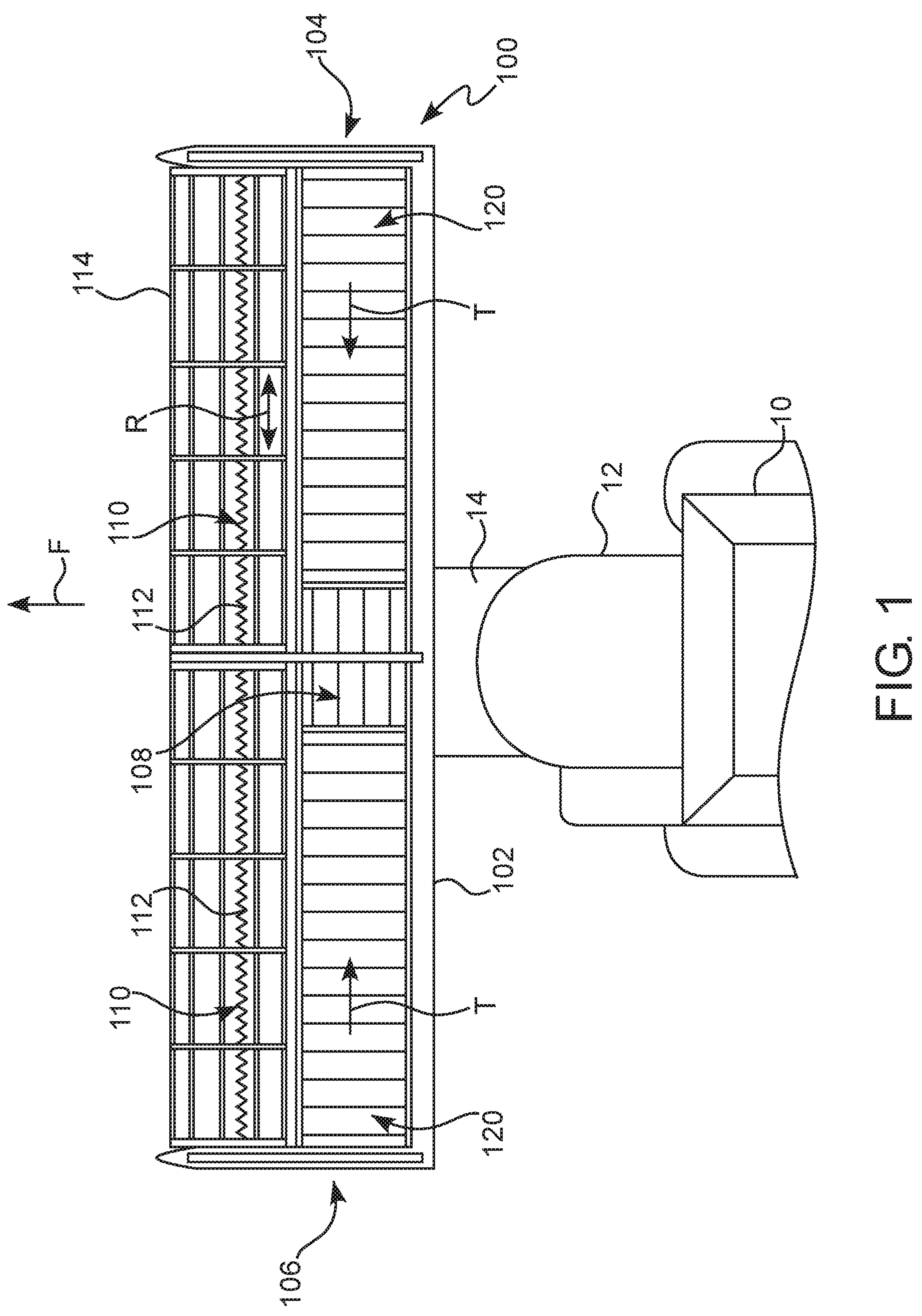
FIG. 1 is a top view of an agricultural harvester and a header in accordance with an exemplary embodiment of the subject disclosure.
Figure 2:
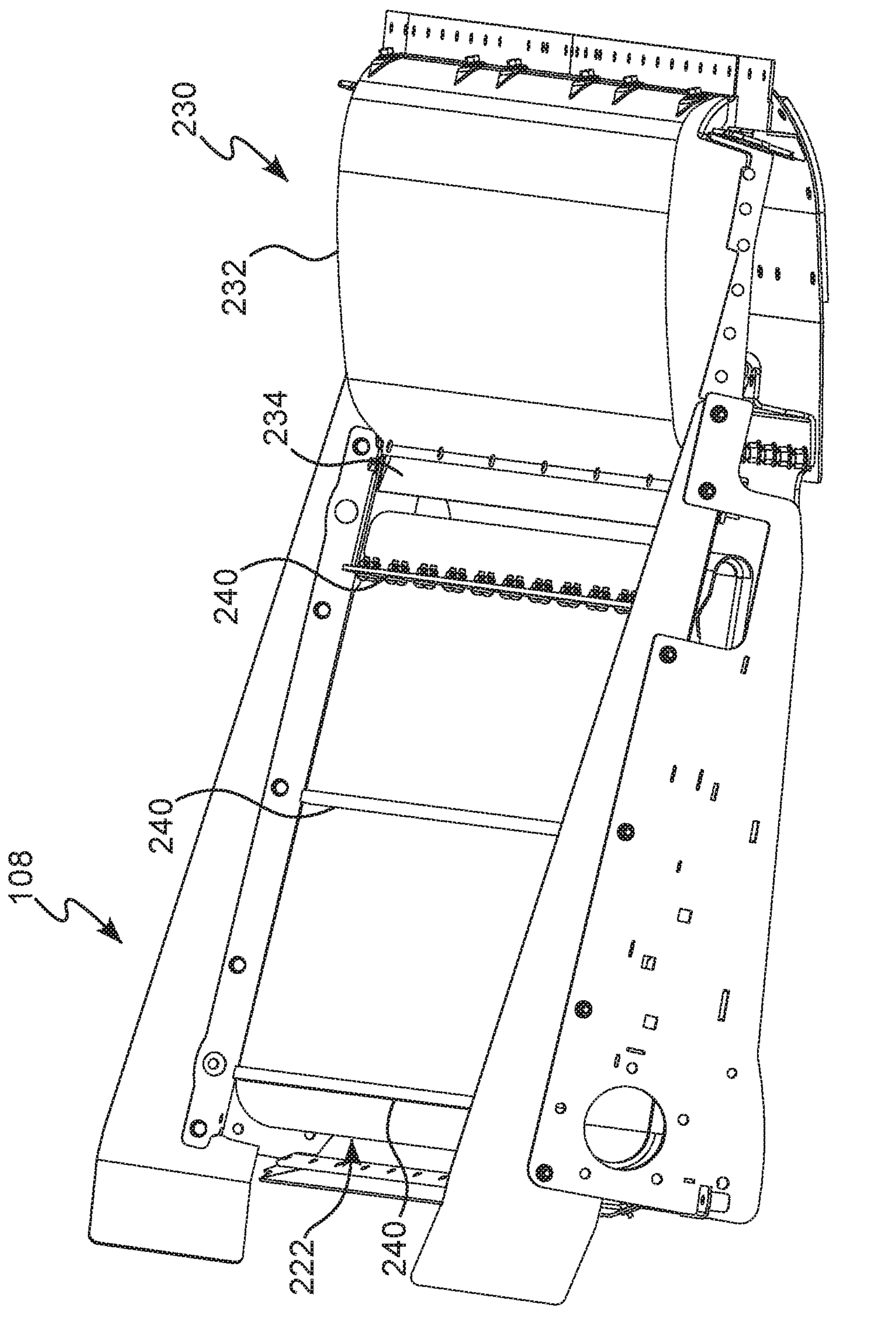
FIG. 2 is an end view of a portion of the agricultural harvester header of FIG. 1.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term “distal” shall mean away from the center of a body. The term “proximal” shall mean closer towards the center of a body and/or away from the “distal” end. The words “inwardly” and “outwardly” refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term “a,” as used in the specification, means “at least one.” The terminology includes the words above specifically mentioned, derivatives thereof, and words of similar import.

The terms “grain,” “ear,” “stalk,” “leaf,” and “crop material” are used throughout the specification for convenience and it should be understood that these terms are not intended to be limiting. Thus, “grain” refers to that part of a crop which is harvested and separated from discardable portions of the crop material. The header of the subject application is applicable to a variety of crops, including but not limited to wheat, soybeans and small grains. The terms “debris,” “material other than grain,” and the like are used interchangeably.

“About” as used herein when referring to a measurable value such as an amount, a temporal duration, and the like, is meant to encompass variations of ±20%, ±10%, ±5%, ±1%, or ±0.1% from the specified value, as such variations are appropriate.

“Substantially” as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, and more particularly to FIG. 1, there is shown an exemplary embodiment of an agricultural vehicle 10 in the form of, e.g., a combine harvester or agricultural harvester which generally includes a chassis 12, a feeder housing or feederhouse 14, and an attachment in the form of a header 100. Typically, the agricultural harvester 10 includes additional internal systems for the separation and handling of collected crop material. However, these additional systems are not essential for a full and proper understanding of the subject disclosure. It should be appreciated that the draper belt described and illustrated herein does not necessarily need to be included on combine harvesters, but can be incorporated in other agricultural vehicles or devices having draper belts.

The header 100 is coupled to, and supported by, the chassis 12 of the agricultural vehicle 10 by, for example, coupling to the feeder housing 14. In the exemplary embodiment shown, the header 100 is in the form of a draper header to harvest bushy or fluffy crop material. The header 100 has a frame 102 coupled to the chassis 12 by coupling to the feeder housing 14 and a pair of opposed lateral ends 104, 106. The header 100 may support one or more flexible cutter bar assemblies 110 with reciprocating knives 112 to cut crop material as the agricultural vehicle 10 travels in a forward direction, denoted by arrow F. The reciprocating knives 112, which may be referred to as cutting elements, can be reciprocated back-and-forth in a lateral direction, denoted by arrow R, relative to the forward direction F in a known manner, e.g., by a wobble box, epicyclic drive, etc. Exemplary cutting elements applicable to the present exemplary embodiments are disclosed, e.g., in U.S. Pat. Nos. 7,730,709 and 8,151,547, the entire disclosures of which are incorporated by reference herein in their entirety for all purposes.

The header 100 further includes an infeed conveyor 108 that conveys the crop material into the feeder housing 14. The header 100 may also include one or more lateral, flexible draper belts 120 that are positioned rearwardly of the cutter bar assemblies 110 and travel, e.g. rotate, in opposing directions of travel, denoted by each arrow "T", in order to convey crop material inwardly to the infeed conveyor 108 and thereby the feeder housing 14. The header 100 may also include a rotating reel 114 with tines or the like to sweep the crop material inwardly towards the draper belts 120.

Figure 3:
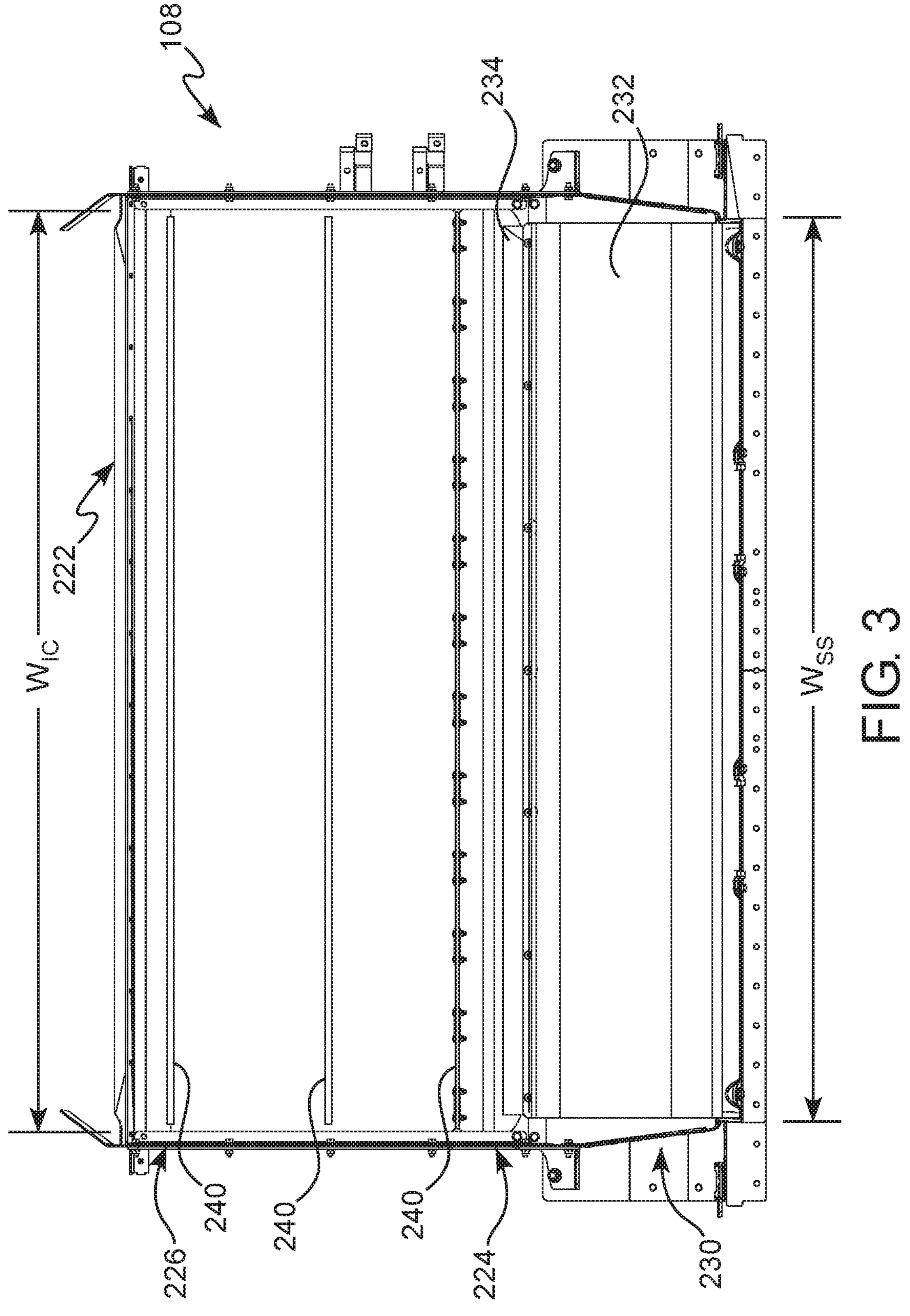
FIG. 3 is a top plan view of the portion of the agricultural harvester header of FIG. 2.
Figure 4:
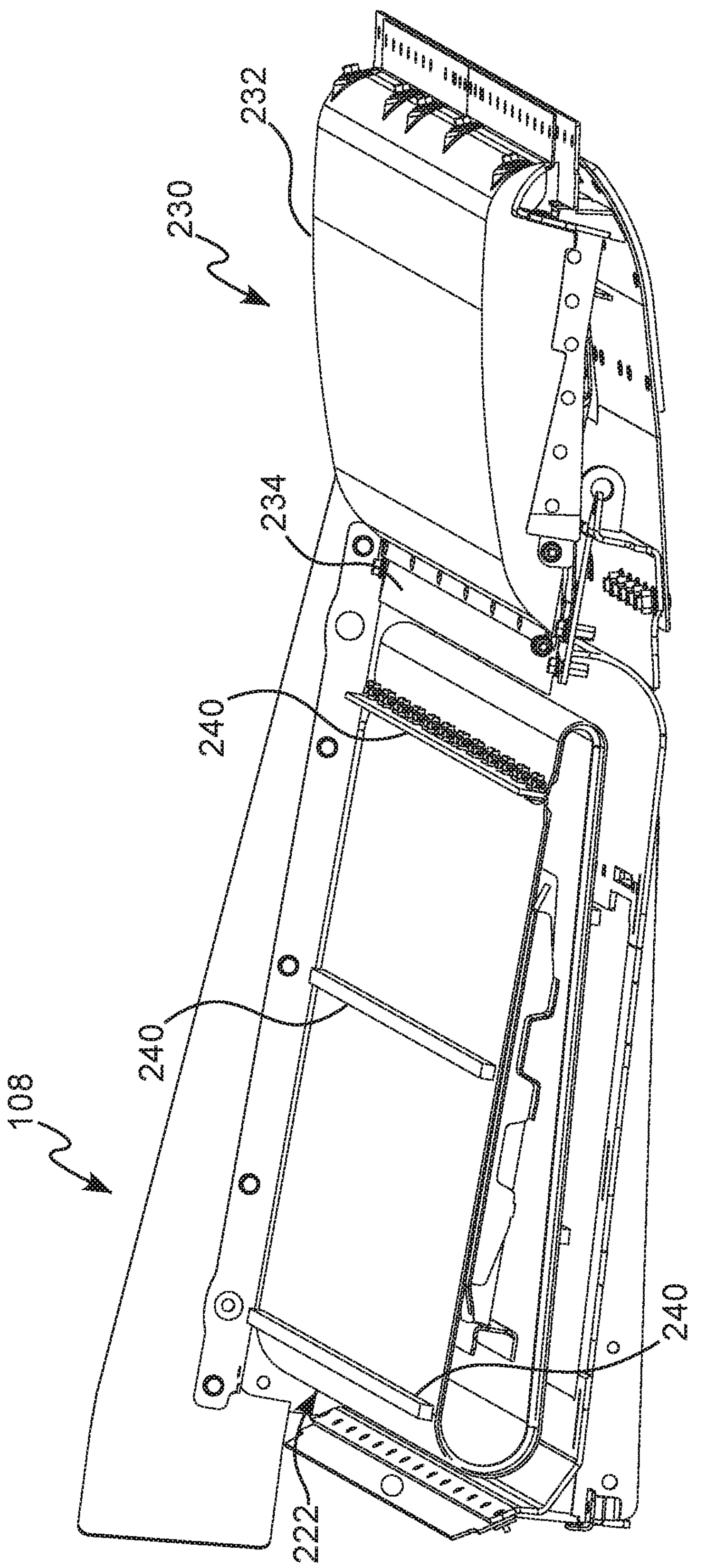
FIG. 4 is a perspective end view of the portion of the agricultural harvester header of FIG. 2 with certain elements omitted for purposes of clarity.
Figure 5:
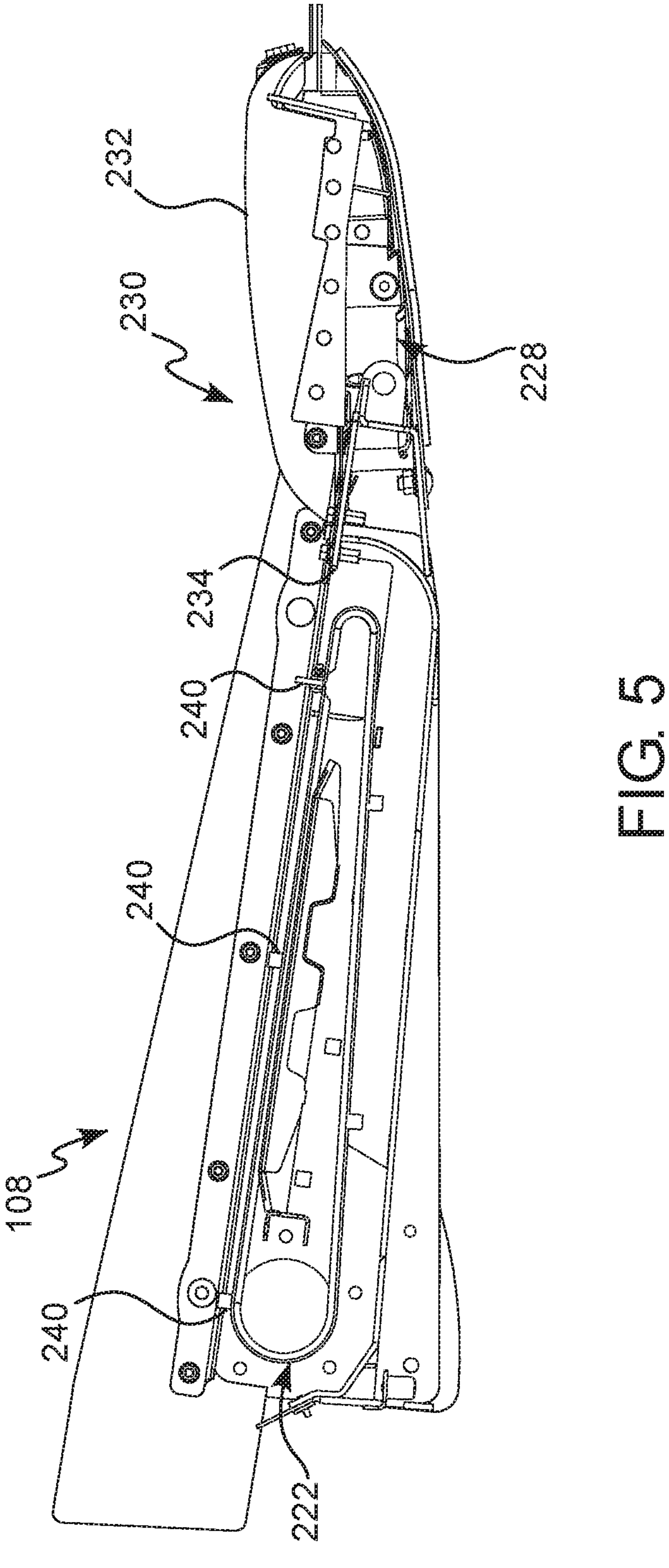
FIG. 5 is an end view of the portion of the agricultural harvester header of FIG. 2 with certain elements omitted for purposes of clarity.

As shown in FIGS. 2-6, the infeed conveyor 108 has a belt 222, a fore end 224 and an aft end 226. A center knife drive 228 (FIG. 5) is disposed adjacent to and forwardly of the infeed conveyor, and a knife drive cover 230 covers the center knife drive. The knife drive cover comprises a main body 232 substantially covering an entire width of the center knife drive. The knife drive cover additionally comprises a seed saver 234 extending rearwardly from an aft end of the main body 232. As shown in FIG. 3, the seed saver is substantially planar and includes a width "$W_{SS}$" substantially the same as or coextensive with a width "$W_{IC}$" of the infeed conveyor 108. The seed saver defines a plane (FIG. 6) substantially parallel to the infeed conveyor a longitudinal axis "A" of the infeed conveyor.

Figure 6:
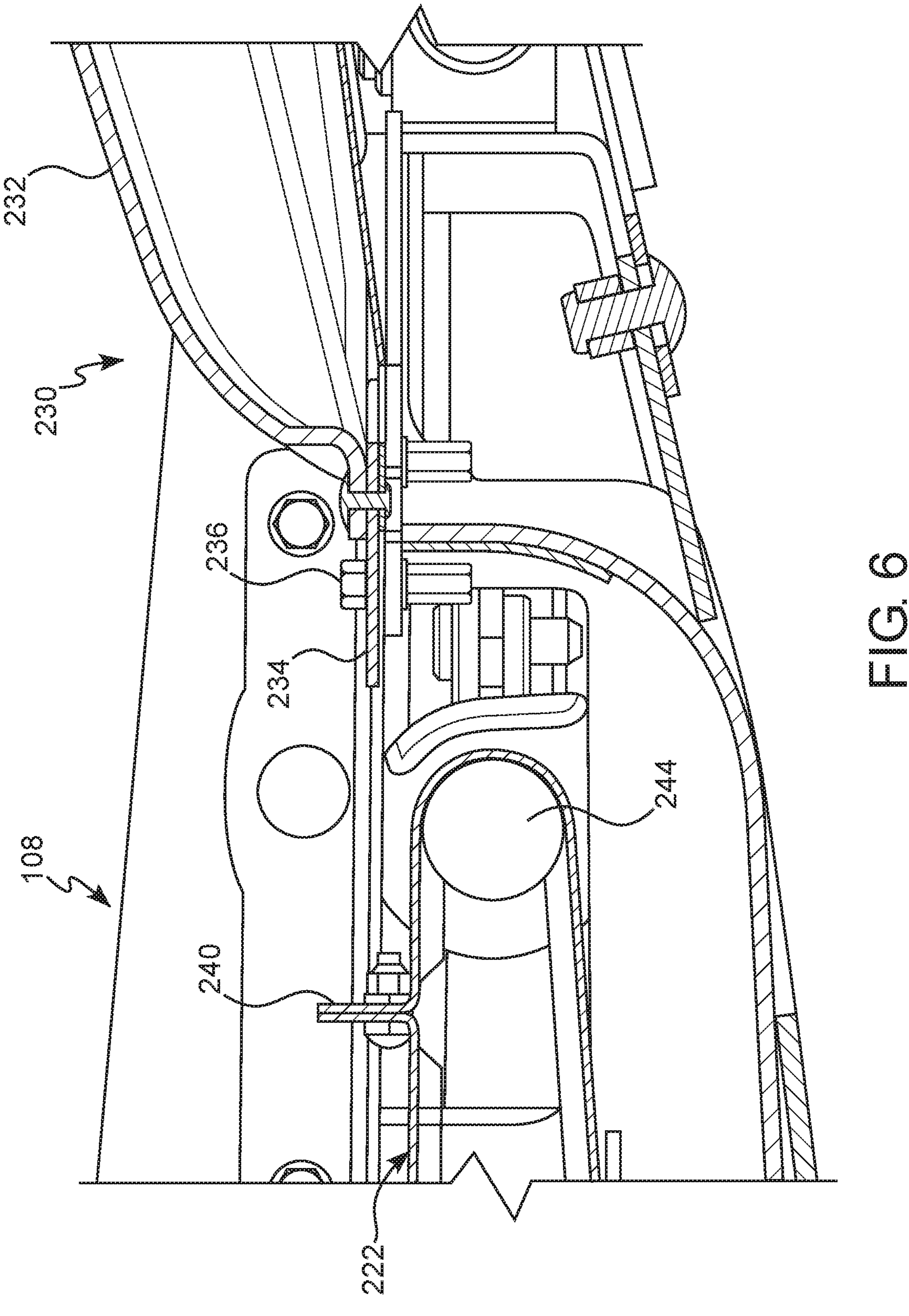
FIG. 6 is a partial enlarged cross-sectional end view of the portion of the agricultural harvester header of FIG. 2 with certain elements omitted for purposes of clarity.
Figure 7:
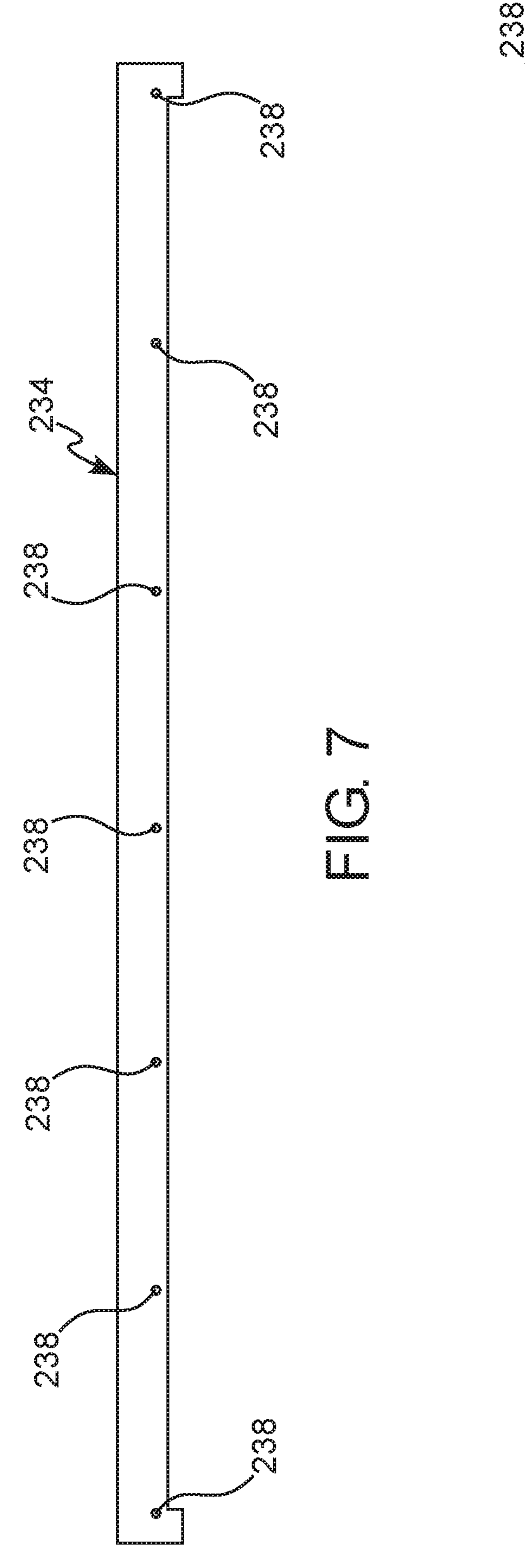
FIG. 7 is top plan view of a seed saver in accordance with an exemplary embodiment of the subject disclosure.
Figure 7A:
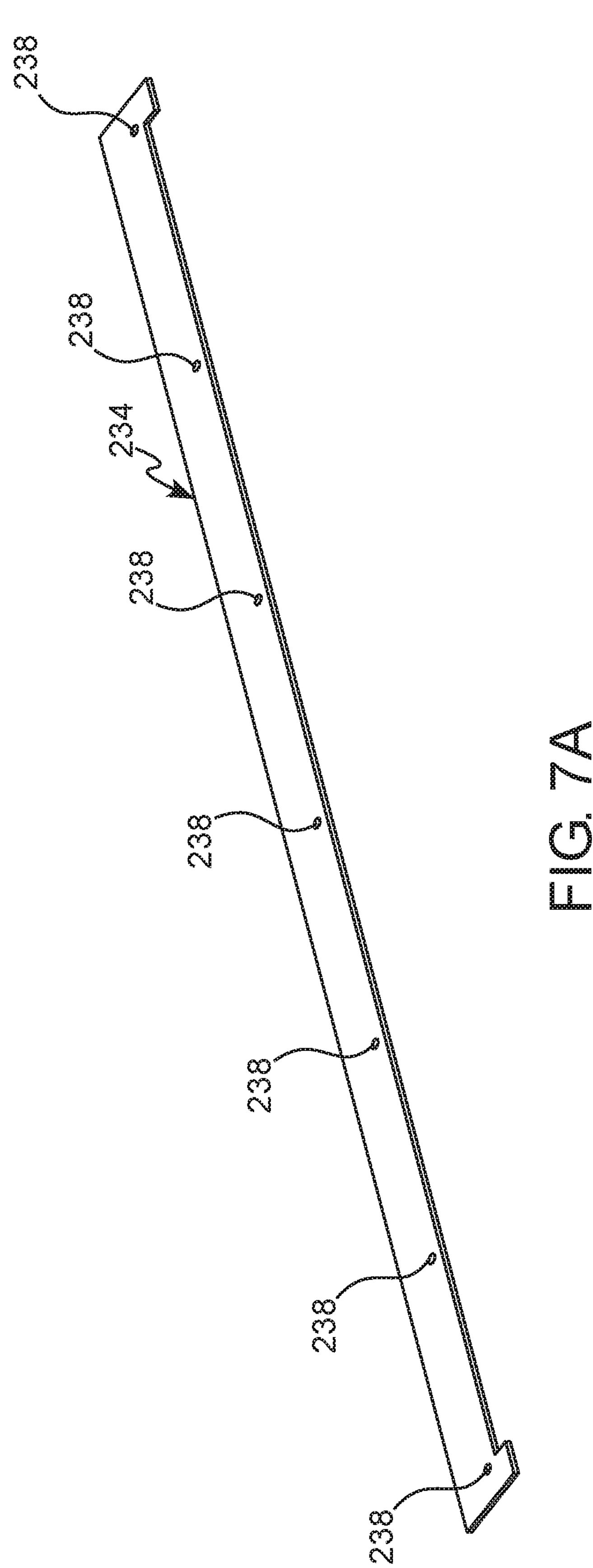
FIG. 7A is a perspective view of the seed saver of FIG. 7.

As best shown in FIG. 6, the seed saver is positioned above and forwardly of the belt 222 of the infeed conveyor 108 and below the main body 232. The seed saver 234 is integrated with the main body 232. According to an aspect, the seed saver can be integrally formed with the main body. According to another aspect, the seed saver can be attached to the main body by fasteners 236 (FIG. 6) including, without limitation, threaded fasteners or rivets. As shown in FIGS. 7 and 7A, the seed saver is provided with a plurality of openings 238 spaced apart along a length thereof and structured to receive the fasteners 236.

The seed saver 234 is spaced from the infeed conveyor belt 222 about 3-30 mm including, e.g., 2, 4, 5, 6, 7, 8, 9, 10, 11, 12, 13, 14, 15, 16, 17, 18, 19, 20, 21, 22, 23, 24, 25, 26, 27, 28, 29, 31, 32, and 33 mm. The infeed conveyor includes upstanding lugs 240 extending substantially transverse to the direction of travel of the belt 222. According to an aspect, at the closest point of the lugs 240 to the seed saver 234 during movement of the belt 222, the seed saver is spaced from the lugs about 3-30 mm. Preferably, at their closest point the seed saver is spaced from the lugs about 6-15 mm. Even more preferably, at their closest point the seed saver is spaced from the lugs about 10 mm.

Figure 8:
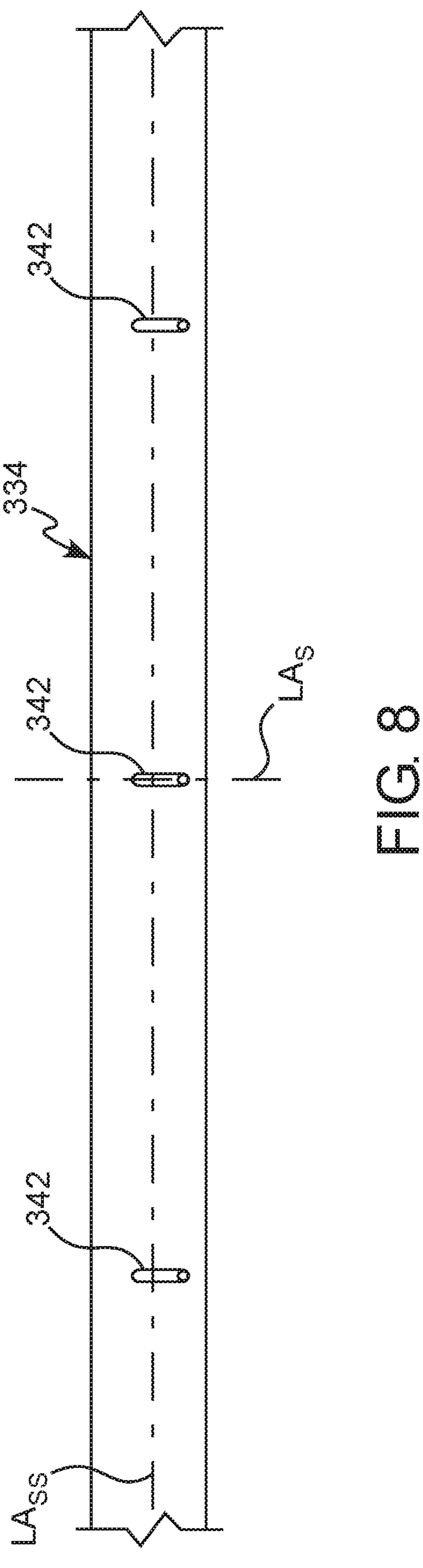
FIG. 8 is a partial enlarged top plan view of a seed saver in accordance with a further exemplary embodiment of the subject disclosure.

According to another aspect, the seed saver can be a seed saver 334 adjustable in position relative to the main body. In this regard, as shown in FIG. 8, the seed saver 334 includes a slot 342 to receive a fastener attaching the seed saver to the main body. According to an aspect, the seed saver 334 includes a plurality of slots 342 spaced apart along the length of the seed saver. The slot 342 of the seed saver has a longitudinal axis "$LA_S$" extending substantially transverse to a longitudinal axis of the seed saver "$LA_{SS}$".

The seed saver 234 or 334 can be formed from any material suitable to reduce loss of seeds or grain from the header during movement of the infeed conveyor belt 222. For example, the seed saver or can comprise a metal, a composite or a polymer. The seed saver can also comprise an elastomeric material or fabric reinforced rubber, SBR rubber or neoprene rubber with fabric, e.g., polyester, insert.

According to the subject disclosure, the seed saver is disposed adjacent the nose or fore end of the infeed conveyor belt to block unwanted expulsion of seeds or grain from the header. That is, the seed saver reduces the likelihood of seeds or grain being expelled from the header as the belt lugs 240 travel around the front roller 244 of the infeed conveyor 108 and engage seeds or grain delivered to the infeed conveyor from the lateral draper belts 120.

Additionally, by being integrated into the main body of the knife drive cover, the seed saver according to the subject disclosure is secured to the header without supplemental metal brackets and other associated mounting hardware.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A header for an agricultural harvester comprising:

an infeed conveyor having a fore end and an aft end;

a center knife drive disposed adjacent to and forwardly of the infeed conveyor; and a knife drive cover covering the center knife drive, the knife drive cover comprising:

a main body substantially covering an entire width of the center knife drive, and a seed saver extending rearwardly from an aft end of the main body, wherein the seed saver is substantially planar, includes a width substantially coextensive with a width of the infeed conveyor, and defines a plane substantially parallel to the infeed conveyor;

wherein the seed saver comprises a slot that receives a fastener attaching the seed saver to the main body; and wherein the slot has a longitudinal axis extending substantially transverse to a longitudinal axis of the seed saver.

2. The header of claim 1, wherein the seed saver is positioned above and forwardly of a belt of the infeed conveyor.

3. The header of claim 2, wherein the seed saver is positioned below the main body.

4. The header of claim 2, wherein the seed saver is spaced from the infeed conveyor belt about 3-30 mm.

5. The header of claim 1, wherein the infeed conveyor includes lugs and the seed saver is spaced from the lugs about 3-30 mm.

6. The header of claim 1, wherein the infeed conveyor includes lugs and the seed saver is spaced from the lugs about 6-15 mm.

7. The header of claim 1, wherein the infeed conveyor includes lugs and the seed saver is spaced from the lugs about 10 mm.

8. The header of claim 1, wherein the seed saver is integrally formed with the main body.

9. The header of claim 1, wherein the seed saver is attached to the main body by fasteners.

10. The header of claim 9, wherein the seed saver is positioned below the main body.

11. The header of claim 1, wherein the seed saver is adjustable in position relative to the main body.

12. The header of claim 1, wherein the seed saver comprises a metal, a composite or a polymer.

13. The header of claim 1, wherein the seed saver comprises an elastomeric material.

14. The header of claim 1, wherein the seed saver comprises fabric reinforced rubber, SBR rubber or neoprene rubber with fabric insert.

15. An agricultural harvester comprising a header that comprises:

an infeed conveyor having a fore end and an aft end;

a center knife drive disposed adjacent to and forwardly of the infeed conveyor; and a knife drive cover covering the center knife drive, the knife drive cover comprising:

a main body substantially covering an entire width of the center knife drive, and a seed saver extending rearwardly from an aft end of the main body, wherein the seed saver is substantially planar, includes a width substantially coextensive with a width of the infeed conveyor, and defines a plane substantially parallel to the infeed conveyor;

wherein the seed saver comprises a slot that receives a fastener attaching the seed saver to the main body; and wherein the slot has a longitudinal axis extending substantially transverse to a longitudinal axis of the seed saver.

* * * * *